No. 726,294. PATENTED APR. 28, 1903.
F. J. HOYT.
METHOD OF EXTRACTING GOLD FROM ORES.
APPLICATION FILED JUNE 2, 1902.
NO MODEL.
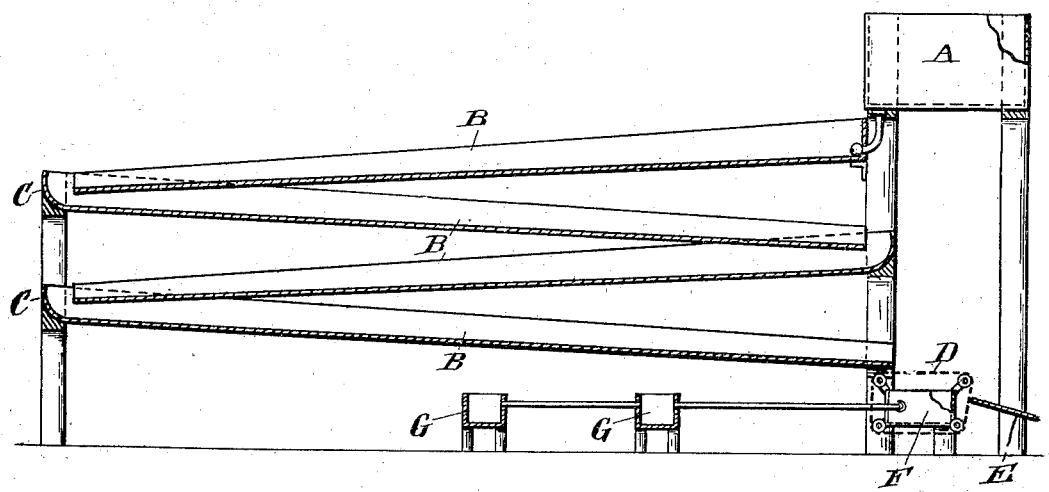

UNITED STATES PATENT OFFICE.

FREDERICK J. HOYT, OF CHICAGO, ILLINOIS.

METHOD OF EXTRACTING GOLD FROM ORES.

SPECIFICATION forming part of Letters Patent No. 726,294, dated April 28, 1903.

Application filed June 2, 1902. Serial No. 109,875. (No specimens.)

*To all whom it may concern:*

Be it known that I, FREDERICK J. HOYT, a citizen of the United States, residing at Chicago, in the county of Cook and State of Illinois, have invented certain new and useful Improvements in Methods of Extracting Gold from Ores, &c., of which the following is a specification, reference being had therein to the accompanying drawing.

This invention relates to an improvement in saving the gold in quartz-mines and in free-milling quartz ores carrying large quantities of flour-gold wherein other metals or substances are incorporated therein which have a tendency to prevent the gold being caught by any of the quicksilver methods.

My invention consists of a number of steps in the treatment of the ore constituting a method which may be performed by different means. The first step is to dissolve all the gold and then from the solution carrying the gold precipitate the gold, and thus save all that is in the quartz. This I accomplish by using a chemical solution—say cyanid of potassium—and using this chemical solution to propel and carry the powdered quartz down an inclined sluiceway of sufficient length to give this chemical time to act and dissolve the gold. It is a well-known fact that in the use of cyanid of potassium it is necessary that oxygen be supplied to the solution to have it act, as well as agitation. One of the present modes of obtaining gold by dissolving the same is to place the ore or quartz after reducing it to certain sizes in large tanks holding from fifty to five hundred tons each. The ore having been introduced into the tank, at the bottom of which a body of water carrying from one-half of one per cent. to fifteen per cent. of cyanid of potassium, is forced up through the powdered ore, oxygen being introduced into and throughout the pulp and agitation given to the pulp mechanically. By this process from eight to forty-eight hours is necessary to dissolve the gold. When the solution is drawn off and the gold precipitated, either by zinc-shavings or otherwise, according to the chemical used, in order that the solution may be forced up through the pulp it necessitates its reduction to a very coarse powder, preferably one-fourth of an inch in size. If reduced to a finer mesh, it would be impossible to force the solution up through the pulp, as the pulp would pack and resist the percolation of the solution through it. The ore thus being in a coarse condition requires time to enable the solution to enter the large pieces and dissolve the coarse gold therein. It being well known that while cyanid of potassium will dissolve flour-gold or gold reduced to one hundred mesh fine or finer almost instantly, it requires a much longer time to dissolve it when coarse or embedded in or incrusted by larger parts of the other material. It is also well known that cyanid of potassium as well as many other chemicals attack and dissolve other metals as well as the salts, &c., found generally with all kinds of refractory ores, that this action on the other salts and metals is slower than its action on gold, and where the pulp is coarse and tanked and of necessity the solution left in it for hours and often days large amounts of the chemicals are used up and wasted on substances of no value and that cannot be saved by the ordinary means adopted to precipitate and save the gold. Where a large amount of chemical is thus wasted, it adds materially to the cost of saving the gold and is often prohibitory to the working of many gold ores. My invention obviates all this loss of chemicals and saves large expense in the handling of the pulp. I use the pulp reduced to one hundred or one hundred and fifty mesh fine, run it over a sluiceway of sufficient length so that ten or twelve minutes is taken up in flowing the pulp to the tail-race, which is ample time for the cyanid to dissolve all the gold powdered to that degree and yet too short to waste the chemical on the base metals that may be in the pulp. The sluiceway I employ is from one thousand to three thousand feet in length, as may be found necessary, or even longer. It is not necessarily built straight this length, but may be elevated and run back and forth, as shown in the accompanying drawing, or it may be made in circular form, passing around a circle several times at different elevations to give time enough for the solution to dissolve the gold, which in no case need exceed twelve minutes with pulp ground to one hundred mesh. The time consumed corresponds to the fineness of the pulp. It will be seen that on an open sluiceway the oxygen is furnished in great quantities as well as the agitation, which helps the action of the chemical.

One form of apparatus which I employ to carry out my method is diagrammatically illustrated in the accompanying drawing, which is a longitudinal side elevation.

In the drawing, A designates the tank for holding the chemical solution; B B B B, a series of slightly-inclined sluiceways arranged one beneath the other, running in opposite directions, the lower ones overlapping the upper ones by upturned ends C; D, a screening apparatus on which the ore and solution are passed from the last sluiceway, and E a tailpiece on which the tailings are received. The solution passes through a screen to a tank F, from which it is led to receptacles G, where it is subjected to the action of reagents and the gold precipitated.

As before indicated, the ore is first pulverized by proper machinery to from one hundred to two hundred mesh fine, and it is then discharged onto the head of the sluiceway. This may be of any width desired, but is preferably from five to ten feet wide, which enables large quantities of powdered ore to be handled and with less pitch to the sluiceway. The pulp is spread thinly over the bottom of the sluiceway, so that the oxygen has a better chance to work, while the pulp is agitated all the time as it is forced down the sluice by the propelling action of the solution. After the pulp has traveled a sufficient distance to give the solution time enough to dissolve the gold, which can soon be easily determined, as the pulverization is of a fixed and uniform condition, the solution is cut off from the pulp by the screen revolving over the tank, the pulp going forward into the tailrace, while the solution is conveyed from the tank through zinc-shavings or other reagent in the reagent-pots and the gold precipitated and saved.

What I claim is—

The method of milling gold ore consisting of the following steps: first pulverizing the ore; second, distributing the ore thinly over a wide, long and open sluiceway; third, flowing the ore and propelling it forward over its bed by the action of a stream of chemical solution adapted to dissolve the ore; fourth, automatically screening and separating the solution from the tailings by the same force; and fifth, subjecting the solution to a reagent to precipitate the gold therein, substantially as described.

In testimony whereof I affix my signature in presence of two witnesses.

FREDERICK J. HOYT.

Witnesses:
A. M. HOYT,
WILL H. MOORE.